Figure 1:
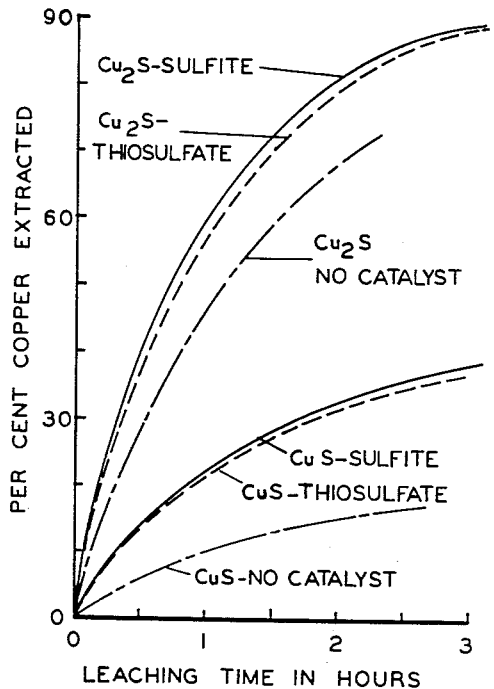

INVENTOR.
H. C. KENNY
and
H. A. ABRAMSON

United States Patent Office 2,727,818
Patented Dec. 20, 1955

2,727,818

METHOD OF LEACHING COPPER SULFIDE MATERIALS WITH AMMONIACAL LEACH SOLUTION

Herman C. Kenny, Lake Linden, and Helmer A. Abramson, Hancock, Mich., assignors to Calumet & Hecla, Inc., a corporation of Michigan Application December 1, 1951, Serial No. 259,446

10 Claims. (Cl. 75—103)

This invention relates to the recovery of copper values from copper materials containing or consisting of copper sulfide or sulfides.

The commonly accepted procedure for solubilizing sulfide ores such as Chalcocite, Chalcopyrite, Bornite or Covellite is by roasting the sulfide to the sulfate and/or oxide. While statements can be found in the literature which would indicate that copper sulfides will dissolve in ammonia, actually their solubility in that medium, with or without aeration, is so slight that it is not worth while to try to make use of it. Ammoniacal ammonium carbonate is a better leaching medium than ammonia alone, and with sufficient aeration and agitation and under suitable conditions can be made to dissolve more than 90% of the copper content of Chalcocite in twenty-four to forty-eight hours. This discovery, however, does not, per se, form any part of the present invention.

In accordance with the present invention, it now has been discovered that copper sulfides can be almost completely dissolved in a much shorter time if there is added to the ammoniacal ammonium carbonate leach solution in which the sulfide is contacted with an oxygen-containing gas a promoter or catalyst of the class consisting of sulfite ion ($SO_3^{--}$), thiosulfate ion ($S_2O_3^{--}$) and mixtures thereof, and further, that the combination of the use of these promoters and elevated temperatures gives solution rates very much greater than can be achieved by the use of the promoter or temperature separately.

It is most desirable to add these catalysts to the leach solution in the form of the ammonium salts, the acids (such as exist) or the copper salt, since these can be added without introducing any foreign substance by way of the positive ion. It is, however, possible to add the catalyst ion by way of other compounds having positive ions which are not desirable but which can be tolerated. Such positive ions as nickel, cobalt, and zinc may be used.

These catalysts are effective in dissolving CuS as well as $Cu_2S$, although the amount of copper dissolved in a given time is much greater in the case of $Cu_2S$. It seems as if one copper atom from the $Cu_2S$ molecule dissolves readily and leaves CuS, which dissolves only with greater difficulty. It has been found that nearly half the copper in $Cu_2S$ dissolves fairly quickly, without any catalyst, in the ammonia-ammonium carbonate leach solution (with air or oxygen). Also, the amount of copper dissolved according to the present invention levels off about fifty percent higher in the case of $Cu_2S$ than in the case of CuS. That is, copper extraction in the case of $Cu_2S$ is about equal to copper extraction in the case of CuS plus fifty percent of the contained copper in the $Cu_2S$.

Figure 2:
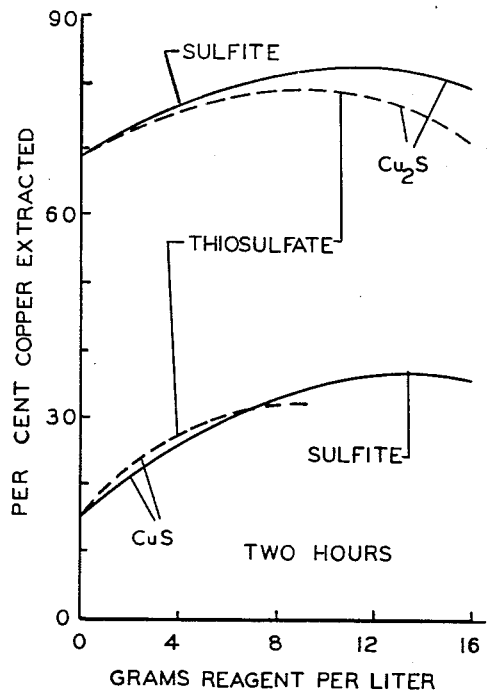
Figure 3:
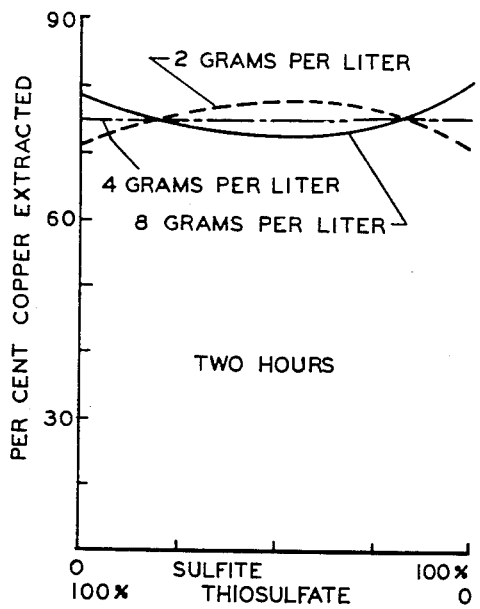

The indicated relations between solution of $Cu_2S$ and CuS and the effect of the catalysts are more specifically set forth and described hereinafter in connection with the accompanying drawings, wherein Fig. 1 is a graphic representation of the solubility of Chalcocite ($Cu_2S$) in ammoniacal ammonium carbonate solution (with aeration and agitation) with sulfite ion, thiosulfate ion and no catalyst, as well as CuS with sulfite, thiosulfate and no catalyst, copper extraction being plotted against leaching time; Fig. 2 indicates the effect of varying amounts of catalyst in dissolving $Cu_2S$ and CuS. Fig. 3 indicates the effect of mixing the sulfite and thiosulfate promoters, copper extraction being plotted against proportions of catalyst in the mixture; and Fig. 4 indicates the effect of mixing the catalysts on the total catalyst required, copper extraction being plotted against concentration of catalyst.

It is not known with certainty how the promoters function, but it is known that thiosulfate ion ($S_2O_3^{--}$) is oxidized by air or oxygen in the presence of $Cu^{++}$ to $SO_3^{--}$ plus $SO_4^{--}$, and that $SO_3^{--}$ reacts with CuS to form $S_2O_3^{--}$. The formation of $SO_3^{--}$ in the leach solution which initially contains only ammoniacal ammonium carbonate is not understood, but it does seem to take place. In the case of CuS (synthetic or Covellite) at room temperature, the rate is so slow that CuS was at first reported to be insoluble. In the case of $Cu_2S$, the rate is appreciable, one atom of copper in each molecule being relatively soluble, resulting in faster buildup of $Cu^{++}$ ion. With $Cu^{++}$ ion initially present (e. g., 20 g./l.) solution proceeds more rapidly, especially so at elevated temperatures. It is probable, therefore, that the presence of copper ion may not only promote oxidation of $S_2O_3^{--}$ to $SO_3^{--}$ and $SO_4^{--}$, but may also catalyze the oxidation of CuS to yield $SO_3^{--}$ ion. In the case of $Cu_2S$ materials, the production of $SO_3^{--}$ from CuS takes place to a substantial extent even while the first atom of Cu is dissolving from $Cu_2S$ leaving CuS. Initial presence of $Cu^{++}$ ion also catalyzes solution of the first atom of Cu from $Cu_2S$.

The basic leaching solution which is preferred according to the invention may be called aqueous, ammoniacal, ammonium carbonate solution. It may be conveniently described by specifying the content of $NH_3$, $CO_2$ and $H_2O$. Since these are the basic constituents of the starting material, and copper goes into solution probably in complex form, concentrations of $NH_3$, $CO_2$ and Cu will be indicated hereinafter in grams per liter, it being understood that the remainder is water except for sulfur, impurities and addition agents. Sulfur dissolves to an extent to indicate that the first Cu from $Cu_2S$ dissolves without solution of sulfur, and the Cu from CuS dissolves only when its sulfur also dissolves. X-ray determinations show that after a major portion of the copper has dissolved, the residue contains only CuS, that is, shows the Covellite (CuS) crystal pattern. The appearance of the residue is also that of Covellite, and analysis shows Cu and S present in equimolecular proportions.

The following table shows operating ranges in grams per liter which may be used satisfactorily.

TABLE I

| | |
|---|---|
| $NH_3$ | 40 to 200, preferably 60 to 120. |
| $CO_2$ | 15 to 100, preferably 20 to 50. |
| Cu (dissolved) | 0 to 150, suitably 20 to 60. |
| Copper sulfide (solid phase) | 2 to 100, preferably 10 to 50 (Cu content). |
| $SO_3^{--}$ ion and/or $S_2O_3^{--}$ ion | 0.1 to 15, preferably 0.3 to 5.0. |

$O_2$ (air or oxygen) is passed through mixture during reaction at a rate at least enough to suspend the ore, and, ordinarily, at least 2½ and preferably 3 or more atoms of oxygen per atom of Cu in the copper sulfide material treated. It will be understood that ammonia evolved will be recovered for re-use in the process.

Temperature of the reaction mixture is of importance and should be kept within the limits from 35° C. to 70° C., preferably within the limits from 40° C. to 65° C. At low temperatures the reaction slows down, while at too high temperatures ammonia escapes and the rate of dissolution goes down. If pressure is employed, a higher temperature becomes practical, e. g. 100° C. Pressures up to 60 atmospheres are feasible.

Either air or oxygen may be used, and should be passed through the solution during the reaction, preferably at a rate to maintain the ore or copper compound being dissolved in suspension in the liquid phase. Alternatively, suspension may be maintained by mechanical agitation. It is to be understood that the ore or other copper sulfide material is finely divided. It should be 100 mesh or finer, but some coarser material can be tolerated in the reaction mixture. It is desirable also to introduce the air or oxygen in the form of small-sized bubbles, e. g. through a porous block, as this speeds up the reaction. Larger bubbles can be broken up by mechanical agitation.

Not only are the $SO_3^{--}$ and $S_2O_3^{--}$ ions effective singly but they may be used together in any proportions, and their mixtures are even more effective than either of them without the other. The superior effectiveness of the mixture resides especially in that smaller total quantity (up to 2 grams per liter) of promoter will bring about dissolution of the CuS or $Cu_2S$ at the same rate as a larger quantity of either of the promoters alone.

The following specific example and table will serve to illustrate the invention:

*Example*

Figure 1 shows in graphic form the result of leaching at 60° C. 25 grams of Chalcocite ore or concentrate ($Cu_2S$) containing 26.1% Cu and 6.25% sulfur with 250 ml. of a solution initially containing no copper, 120 g./l. $NH_3$, 50 g./l. $CO_2$ and no catalyst, or $SC_2O_3^{--}$ or $SO_3^{--}$ as indicated. Fig. 1 also shows the effect of leaching at 60° C. 10 grams of CuS (reagent grade, 66.0% Cu, 32.0% S) with 250 ml. of a solution initially containing no copper, 120 g./l. $NH_3$, 50 g./l. $CO_2$ and no catalyst, $SO_3^{--}$ ion or $S_2O_3^{--}$ ion as indicated. In each case aeration was 0.3 liter per minute, an excess over stoichiometric proportions of oxygen for conversion of all the copper present to $Cu(OH)_2$. With no catalyst, at the end of two hours, the extraction in the case of CuS was 15.7% of the Cu; with 1 gram of ammonium sulfite it was 32.0%; with 4 grams of ammonium sulfide, it was 33.7%. With 1 gram of ammonium thiosulfate the extraction was 27.4% of the Cu; with 2 grams of ammonium thiosulfate it was 31.4%.

In the case of Chalcocite ore or concentrate ($Cu_2S$) the extraction with no catalyst at the end of 2 hours was 67.9% of the Cu. With 1 gram of ammonium sulfite, the extraction at the end of 2 hours was 75.1%; with 2 grams it was 81.4%; with 4 grams it was 79.6%. With 1 gram of ammonium thiosulfate, the extraction at the end of 2 hours was 74.5% of the Cu; with 2 grams it was 79.2%; with 4 grams it was 71.5%.

In the following table of batch compositions, except as otherwise indicated, the conditions are the same as in the example.

A surprising result was obtained when small quantities of sulfite and thiosulfate were added. It was found that one-fourth of a gram of a 50–50 mixture of ammonium sulfite and ammonium thiosulfate produced an extraction approximating one gram of either in a two-hour test at 60° C. on Chalcocite concentrate, using 0.3 liter of air a minute, 25 grams of concentrate, 250 ml. of solution, no copper initially, 120 g./l. of $NH_3$ and 50 g./l. of $CO_2$.

Figure 4:
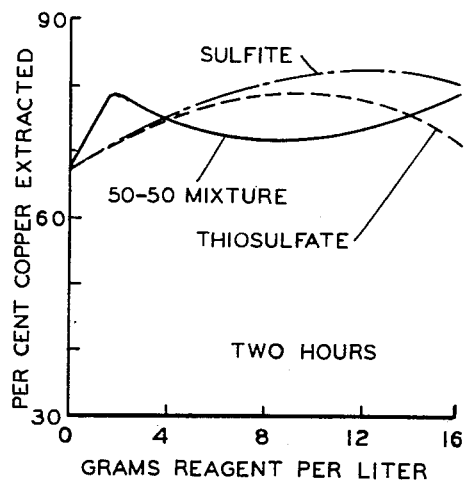

Following are the data on which Fig. 4 is based:

TABLE III

| Agent | Grams Used | Percent Cu Extracted |
|---|---|---|
| None | 0 | 67.9 |
| Ammonium sulfite | 1 | 75.1 |
| Do | 2 | 81.4 |
| Do | 4 | 79.6 |
| Do | 6 | 87.0 |
| Do | 8 | 87.5 |
| Ammonium thiosulfate | 1 | 74.5 |
| Do | 2 | 79.2 |
| Do | 4 | 71.5 |
| Do | 5 | 70.2 |
| 50–50 mixture | 0.25 | 74.0 |
| Do | 0.50 | 77.3 |
| Do | 1 | 75.1 |
| Do | 2 | 73.1 |
| Do | 4 | 77.7 |
| Do | 6 | 82.9 |

Other conditions were as in the preceding paragraph.

Some work was done on the use of various mixtures of ammonium sulfite and ammonium thiosulfate. Fig. 3 shows the variation from all ammonium sulfite through the 50–50 mixture of Table III to 100% ammonium thiosulfate. As indicated, in a two-hour test on Chalcocite concentrate at 60° C., 120 g./l. $NH_3$, 50 g./l. $CO_2$, no Cu, at 8 grams promoter per liter, the mixtures ran from 78% extraction at pure thiosulfate through 73% at 50–50 and to 82% at pure sulfite. At 4 grams per liter of promoter the extraction varied little from 75% at all proportions. At 2 grams per liter, the two-gram curve is reversed, going from 72% at pure thiosulfate, through 77% at 50–50 mixture, to 70% at pure sulfite.

Having thus described the invention, what is claimed is:

1. In a process for recovering copper values from copper sulfide material, the step of contacting a batch of such material in solid state until a major portion of the copper content has been dissolved with an oxygen-containing gas and an aqueous, ammoniacal, ammonium carbonate leaching solution containing initially from 0.1 to 15 grams per liter of a promoter of the class consisting of sulfite and thiosulfate ions and mixtures thereof, said copper sulfide material being immersed in said solution and said oxygen-containing gas being passed therethrough.

2. A process according to claim 1 wherein the concentration of $CO_2$ is from 15 to 100 grams per liter and the concentration of $NH_3$ is from 40 to 200 grams per liter.

3. In a process for recovering copper values from

TABLE II

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Amount of CuS solid (g.) | 10 | 10 | 10 | 10 | 10 | 10 | 10 | 10 | 10 | 10 | | | | | | | | | | | | |
| Amount of $Cu_2S$ ore (g.) | | | | | | | | | | | 25 | 25 | 25 | 25 | 25 | 25 | 25 | 25 | 25 | 25 | 25 | 25 |
| Amount of leach sol. (ml.) | 250 | 250 | 250 | 250 | 250 | 250 | 250 | 250 | 250 | 250 | 250 | 250 | 250 | 250 | 250 | 250 | 250 | 250 | 250 | 250 | 250 | 250 |
| Temperature (° C.) | 60 | 60 | 60 | 60 | 60 | 60 | 60 | 60 | 60 | 60 | 60 | 60 | 60 | 60 | 60 | 60 | 60 | 60 | 60 | 60 | 60 | 60 |
| Amount of air (liters/min.) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Copper (g./l. Cu) | | | | | | | | | | | | | | | | | | | | | | |
| $NH_3$ (g./l.) | 120 | 120 | 120 | 120 | 120 | 120 | 120 | 120 | 120 | 120 | 120 | 120 | 120 | 120 | 120 | 120 | 120 | 120 | 120 | 120 | 120 | 120 |
| $CO_2$ (g./l.) | 50 | 50 | 50 | 50 | 50 | 50 | 50 | 50 | 50 | 50 | 50 | 50 | 50 | 50 | 50 | 50 | 50 | 50 | 50 | 50 | 50 | 50 |
| Leaching time (hrs.) | 2 | 2 | 2 | 2 | 2 | 2 | 2 | 1 | 2 | 3 | 2 | 2 | 2 | 2 | 2 | 1 | 2 | 3 | 1 | 2 | 3 |
| $(NH_4)_2SO_4$ (g.) | | | | 2 | | | | | | | | | | | | | | | | | | |
| $(NH_4)_2SO_3 \cdot H_2O$ (g.) | | 2 | | | 1 | 4 | | 2 | 2 | 2 | 1 | 2 | 4 | | 2 | 4 | | 2 | 2 | 2 | | |
| $(NH_4)_2S_2O_3$ (g.) | 2 | | | | | | 1 | | | | | | | 1 | 2 | 4 | | | | 2 | 2 | 2 |
| Copper extraction (percent total Cu in sample) | 31.4 | 30.9 | 13.5 | 14.4 | 24.4 | 33.7 | 27.4 | 20.9 | 32.0 | 38.7 | 75.1 | 81.4 | 79.6 | 74.5 | 79.2 | 71.5 | 57.0 | 81.4 | 88.2 | 52.8 | 79.2 | 88.1 |

Once the copper content of the copper sulfide material has been taken into solution, it can be precipitated by known methods, for example, by distilling off the ammonium and $CO_2$ or a portion thereof.

copper sulfide material, the step of contacting a batch of such material in solid state until a major portion of the copper content has been dissolved with an oxygen-containing gas and an aqueous, ammoniacal, ammonium carbonate leaching solution containing initially from 0.1 to 15 grams per liter of sulfite ion, said copper sulfide material being immersed in said solution and said oxygen-containing gas being passed therethrough.

4. A process according to claim 3 wherein said ion is present in concentration from 0.3 to 5 grams per liter.

5. A process according to claim 4, wherein the concentration of $CO_2$ is from 15 to 100 grams per liter and the concentration of $NH_3$ is from 40 to 200 grams per liter.

6. In a process for recovering copper values from copper sulfide material, the step of contacting a batch of such material in solid state until a major portion of the copper has been dissolved with an oxygen-containing gas and an aqueous, ammoniacal, ammonium carbonate leaching solution containing initially from 0.1 to 15 grams per liter of thiosulfate ion, said copper sulfide material being immersed in said solution and said oxygen-containing gas being passed therethrough.

7. A process according to claim 6 wherein said ion is present in concentration from 0.3 to 5 grams per liter.

8. A process according to claim 7 wherein the concentration of $CO_2$ is from 15 to 100 grams per liter and the concentration of $NH_3$ is from 40 to 200 grams per liter.

9. In a process for recovering copper values from copper sulfide material, the step of contacting a batch of such material in solid state until a major portion of the copper content has been dissolved with an oxygen-containing gas and an aqueous, ammoniacal, ammonium carbonate leaching solution containing initially from 0.1 to 15 grams per liter of a promoter of the class consisting of sulfite and thiosulfate ions and mixtures thereof and the temperature being at least 35° C., said copper sulfide material being immersed in said solution and said oxygen-containing gas being passed therethrough.

10. A process according to claim 9 wherein the concentration of $CO_2$ is from 15 to 100 grams per liter and the concentration of $NH_3$ is from 40 to 200 grams per liter.

References Cited in the file of this patent

UNITED STATES PATENTS

| | | |
|---|---|---|
| 702,047 | Collins | June 10, 1902 |
| 1,131,986 | Benedict | Mar. 16, 1915 |
| 1,516,356 | Taplin | Nov. 18, 1924 |
| 2,576,314 | Forward | Nov. 27, 1951 |